US012500301B2

(12) United States Patent
Schmitt

(10) Patent No.: US 12,500,301 B2
(45) Date of Patent: Dec. 16, 2025

(54) HOUSING FOR ACCOMMODATING BATTERY CELLS AND A MULTIPLICITY OF ELECTRONIC COMPONENTS

(71) Applicant: Robert Bosch GmbH, Stuttgart (DE)

(72) Inventor: Markus Schmitt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 665 days.

(21) Appl. No.: 17/662,469

(22) Filed: May 9, 2022

(65) Prior Publication Data

US 2022/0359940 A1 Nov. 10, 2022

(30) Foreign Application Priority Data

May 10, 2021 (DE) .......................... 102021204696.7

(51) Int. Cl.
*H01M 50/204* (2021.01)
*H01M 10/42* (2006.01)
*H01M 10/613* (2014.01)
*H01M 10/625* (2014.01)
*H01M 10/6554* (2014.01)
(Continued)

(52) U.S. Cl.
CPC ....... *H01M 50/204* (2021.01); *H01M 10/425* (2013.01); *H01M 10/613* (2015.04); *H01M 10/625* (2015.04); *H01M 10/6554* (2015.04); *H01M 10/6556* (2015.04); *H01M 10/656* (2015.04); *H01M 10/6568* (2015.04);
(Continued)

(58) Field of Classification Search
CPC ............. H01M 10/425; H01M 10/667; H01M 2010/4271; H01M 10/613; H01M 10/625; H01M 10/6554; H01M 10/6556; H01M 10/656; H01M 10/6568
See application file for complete search history.

(56) References Cited

U.S. PATENT DOCUMENTS 10,384,544 B2 8/2019 Sekine
10,660,237 B2 * 5/2020 Miura .................. H02M 7/003
(Continued)

FOREIGN PATENT DOCUMENTS

| DE | 102019205388 A1 | 10/2020 |
|----|-----------------|---------|
| EP | 3796415 A1 | 3/2021 |
| EP | 3806230 A1 | 4/2021 |

*Primary Examiner* — Mark Ruthkosky
*Assistant Examiner* — Sarah J Jacobson
(74) *Attorney, Agent, or Firm* — Michael Best & Friedrich LLP

(57) ABSTRACT

A housing (100) for accommodating battery cells and a multiplicity of electronic components (111, 113, 115). The housing (100) comprises an electronics housing (101) for accommodating the multiplicity of electronic components (111, 113, 115), a cell housing (103) for accommodating the battery cells, and at least one coolant path (145) for the temperature control of the housing (100). A separating element (121) is arranged in the electronics housing (101) and divides the electronics housing (101) into at least two regions (115, 117) for the respective accommodation of electronic components (111, 113, 115) of the plurality of electronic components (111, 113, 115), wherein the separating element (121) electromagnetically shields respective regions (115, 117) of the at least two regions (115, 117) from one another, and wherein the separating element (121) is thermally coupled to the at least one coolant path (145).

20 Claims, 13 Drawing Sheets

(51) Int. Cl.
*H01M 10/6556* (2014.01)
*H01M 10/656* (2014.01)
*H01M 10/6568* (2014.01)
*H01M 10/667* (2014.01)
*H01M 50/249* (2021.01)

(52) U.S. Cl.
CPC ....... *H01M 10/667* (2015.04); *H01M 50/249* (2021.01); *H01M 2010/4271* (2013.01)

(56) References Cited

U.S. PATENT DOCUMENTS

2014/0154535 A1* 6/2014 Olsson ................ H01M 10/613
429/53
2018/0326863 A1* 11/2018 Soki .................... H01M 50/209

* cited by examiner

HOUSING FOR ACCOMMODATING BATTERY CELLS AND A MULTIPLICITY OF ELECTRONIC COMPONENTS

BACKGROUND OF THE INVENTION

Individual battery cells are particularly interconnected for applications in the vehicle sector, to constitute battery modules. Battery modules are interconnected to constitute batteries or battery systems.

On the grounds of the multiplicity of different structural spaces in vehicles, variable module sizes are required, in order to permit the optimum exploitation of available structural space.

For the control of the energy take-up or energy output of a battery system, electronic components such as, for example, a DC-DC converter, a cell contacting system, and a power electronic component or "DC breaker" are required. Each of these electronic components generates independent electromagnetic fields, which can cause interference with the operation of other electronic components. Accordingly, any reduction in structural space for the arrangement of electronic components is associated with an increased probability of faults in electronic components.

SUMMARY OF THE INVENTION

In the context of the proposed invention, a housing is envisaged for accommodating battery cells and a multiplicity of electronic components, together with a battery system.

The function of the proposed invention is the robust operation of a battery system. In particular, the function of the proposed invention is the robust operation of a battery system in a vehicle.

Thus, according to a first aspect of the proposed invention, a housing for accommodating battery cells and a multiplicity of electronic components is envisaged. The housing comprises an electronics housing for accommodating the multiplicity of electronic components, a cell housing for accommodating the battery cells, and at least one coolant path for the temperature control of the housing, wherein a separating element is arranged in the electronics housing which divides the electronics housing into at least two regions for the respective accommodation of electronic components of the plurality of electronic components, wherein the separating element electromagnetically shields respective regions of the at least two regions from one another, and wherein the separating element is thermally coupled to the at least one coolant path, in order to transfer thermal energy from the respective electronic components to the coolant flowing in the at least one coolant path.

In the context of the proposed invention, a coolant path is to be understood as a path, particularly a channel system, along which a coolant is conveyed. For example, a coolant path can be a cooling circuit.

The housing envisaged is based upon two sub-housings, such that respective battery cells of a battery, in the cell housing according to the invention, are spatially and thermally separated from electronic components in the electronics housing according to the invention.

According to the proposed invention, it is further provided that the electronics housing is divided into a plurality of regions, in order to permit a plurality of electronic components such as, for example, a DC-DC converter, a DC breaker and a battery cell management system, to be operated in a thermally and electromagnetically separate arrangement from one another.

For the division of the electronics housing into a plurality of regions, the housing envisaged comprises a separating element such as, for example, a plate, particularly an aluminum plate, which firstly functions as a thermal conductor such that, by means of the separating element, electronic components which are connected to the separating element are thermally coupled by means of a coolant, and can be subject to heat-up or heat evacuation accordingly. The separating element secondly functions as an electromagnetic shielding or electronic barrier, such that the mutual influence of electromagnetic fields from the respective electronic components is minimized by the separating element.

For the constitution of electromagnetic shielding, the separating element is connected to the electronics housing in an electrically conductive manner. Electromagnetic waves entering the electronics housing are correspondingly diverted into the separating element.

Moreover, the separating element provided according to the invention is thermally coupled to a coolant path of the proposed housing, such that the separating element assumes a dual function, i.e. firstly the electronic shielding, and secondly the temperature control of electronic components. The coolant path can be configured as a central coolant path for the temperature control of battery cells and electronic components in the proposed housing. Alternatively, the proposed housing can comprise a plurality of coolant paths, wherein the separating element is thermally coupled to one or more of these coolant paths.

It can be provided that the separating element is mechanically coupled to the electronics housing via at least one mechanical interface, and that the separating element is thermally coupled to the electronics housing via at least one thermal interface, which differs from the mechanical interface.

By means of differing interfaces for the thermal and mechanical or electrical coupling of the separating element according to the invention with the electronics housing, these respective interfaces can be designed in a mutually independent manner from one another, such that a thermal interface is optimally designed for thermal conditions, and a mechanical or electrical interface can be optimally designed for mechanical or electrical conditions. Accordingly, the design of the respective interfaces involves no conflict of interests.

It can further be provided that the separating element is arranged with a metallic connection to the at least one mechanical interface, in order to electrically couple the separating element to the electronics housing.

A metallic connection of the separating element to the electronics housing can be achieved, for example, by means of a metal screw, which contact-connects both the separating element and the electronics housing. The separating element can further comprise contact surfaces, upon which a metallic surface such as, for example, an uncoated metal plate surface can be provided for contact-connection with a corresponding contact surface on the housing.

It can further be provided that the at least one mechanical interface comprises a circumferential ribbed arrangement which is constituted on the electronics housing, wherein respective ribs of the ribbed arrangement are configured in the form of screw connections.

By means of a ribbed arrangement, i.e. a repeating arrangement of protuberances or thickenings at one edge of the electronics housing, particularly mechanical stable interfaces for mechanical connection with the separating element can be constituted. A spacing between respective ribs can be selected such that a gap between the separating element and the electronics housing is minimized, thus permitting the achievement of the particularly effective electrical coupling of the separating element with the electronics housing.

It can further be provided that the at least one thermal interface comprises mating couplers for thermal coupling with couplers on the separating element, wherein mating couplers are constituted between respective ribs of the ribbed arrangement and/or circumferentially about the respective ribs.

Thermal mating couplers such as, for example, pockets for the accommodation of thermal couplers such as, for example, tongues, can constitute a thermal path, which runs thermally from the separating element to a respective coolant. Mating couplers can thus assume a specific shape for a respective coupler, in order to permit, for example, an arrangement of "gap fillers" or other ancillary materials on the thermal couplers, thus permitting a correspondingly optimized thermal contact with the separating element.

It can further be provided that the separating element is directly thermally coupled with at least one of the electronic components arranged in the electronics housing, in order to thermally couple the at least one electronic component which is thermally coupled with the separating element to the coolant flowing in the at least one coolant path, and that the electronics housing is directly thermally coupled with at least one further electronic component arranged in the electronics housing, in order to couple the at least one electronic component which is thermally coupled with the electronics housing to the coolant flowing in the at least one coolant path.

By means of a direct thermal coupling of a first electronic component with the electronics housing and an indirect thermal coupling of a further electronic component with the electronics housing via the separating element, various thermal zones can be constituted in the electronics housing, by means of which the various electronic components can undergo heat evacuation or heat-up with a specific efficiency in each case. Correspondingly, the same coolant path can be employed for the temperature control of electronic components having different waste heat outputs.

It can further be provided that the separating element incorporates a cut-out, having an electromagnetically shielded electrical interface for electrical connection between respective electrical components which are mutually separated by means of the separating element.

In order to permit electrical communication between electronic components which are respectively separated by the separating element, an electrical interface can be provided, which extends through an opening or cut-out in the separating element. The electrical interface itself can execute an electromagnetic shielding function, and can comprise, for example, an electromagnetically shielded plug-in connection or a direct contact-connection arrangement of the respective circuit boards of electronic components.

It can further be provided that the electronics housing comprises an electrical interface for communication with a system which is located externally to the housing.

For communication with an external system such as, for example, a drive system of a vehicle, the electronics housing can comprise an electrical interface, which is brought out of the housing, or which is accessible from a surrounding environment of the proposed housing.

It can also be provided that the separating element incorporates multiple curves, in order to constitute a space for the accommodation of an electronic component with maximum rigidity.

By means of spatial bends in the separating element, a space can be provided which encloses a respective electronic component, such that the latter, for example in the event of an accident involving a corresponding vehicle, is particularly effectively protected against damage.

A second aspect of the proposed invention relates to a battery system having a battery, and to a potential configuration of the proposed housing.

The proposed battery system is particularly to be employed as a traction battery for the supply of electrical energy to the drive system of a vehicle.

BRIEF DESCRIPTION OF THE DRAWINGS

Further advantages, features and details of the invention proceed from the following description, in which exemplary embodiments of the invention are described in detail with reference to the drawings. In each case, features mentioned in the claims and in the description can be critical to the invention, either individually or in any arbitrary combination.

In the drawings.

DETAILED DESCRIPTION

Figure 1:
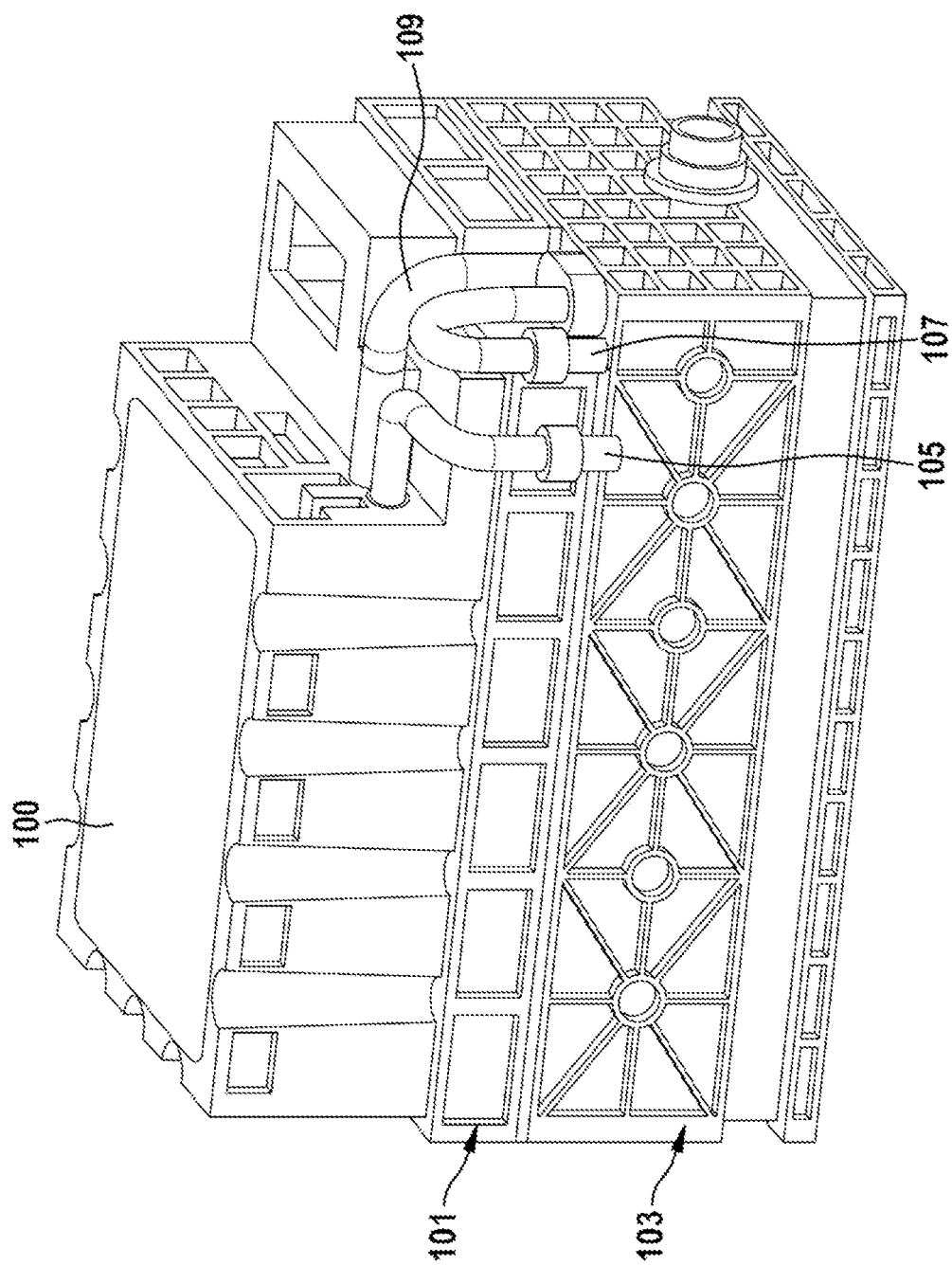
FIG. 1 shows a schematic representation of a potential configuration of the proposed housing.

FIG. 1 represents a housing 100, wherein the housing 100 comprises an electronics housing 101 for accommodating electronic components, a cell housing 103 for accommodating battery cells, and a coolant path having a coolant inlet 105, a coolant outlet 107 and a connecting line 109 for the exchange of coolant between the electronics housing 101 and the cell housing 103.

Figure 2:
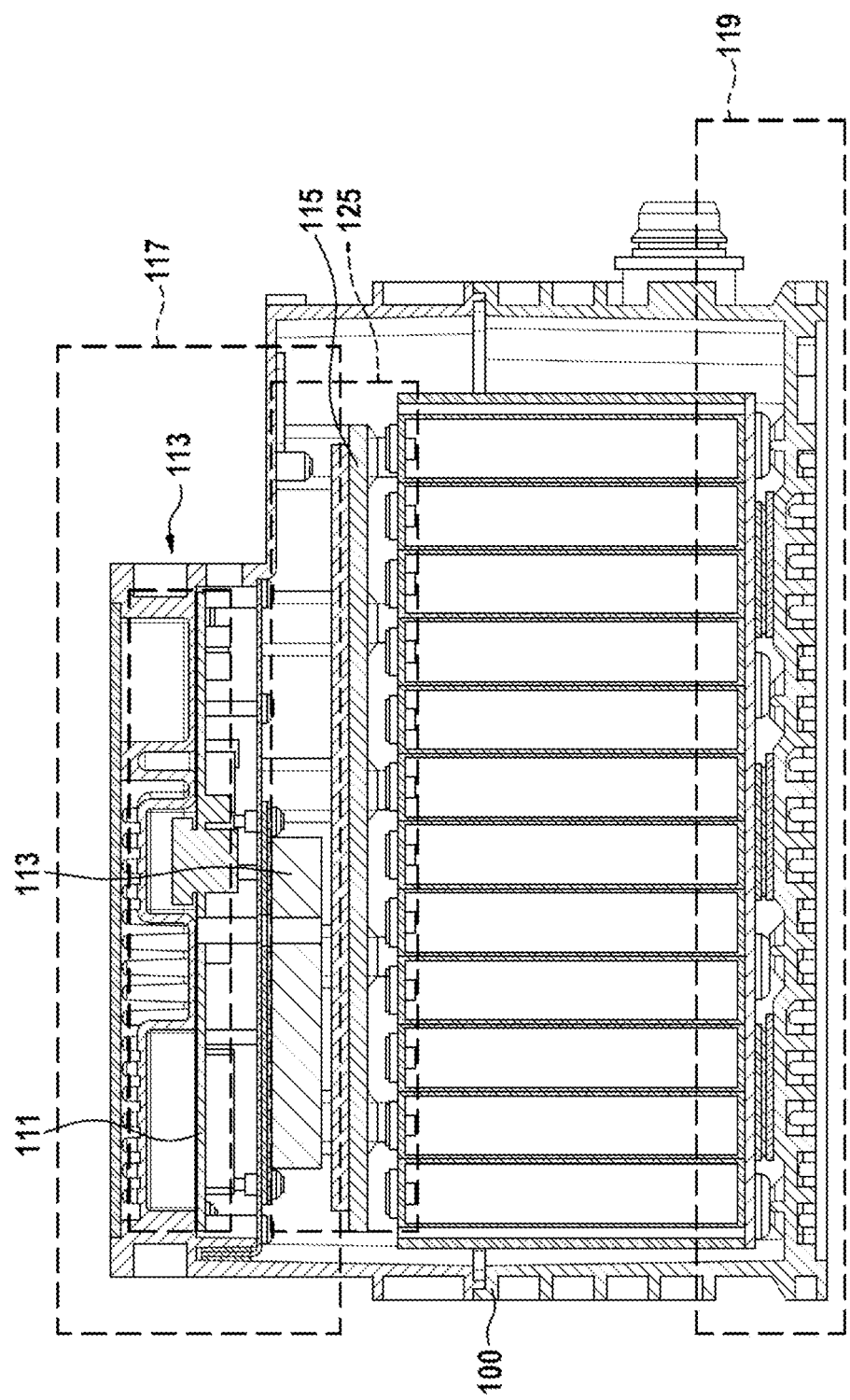
FIG. 2 shows a lateral sectional representation of the housing according to FIG. 1.

FIG. 2 represents a schematic layout of the housing 100, having electronic components in the form of a DC-DC converter 111, a DC breaker 113 and a battery cell management system 115. In the present case, the housing 100 comprises two cooling planes 117 and 119. Whereas the function of the first cooling plane 117 is the cooling of electronic components in the electronics housing 101, the second cooling plane 119 cools battery cells in the cell housing 103.

Electronic components are located in the electronics housing 101, whereas the cell housing 103 is occupied by battery cells.

As a result of differing requirements for heat evacuation from the DC-DC converter 111 and the DC breaker 113, the quantity of heat to be evacuated from the DC-DC converter 111 is greater than that to be evacuated from the DC breaker 113, which impacts upon the embodiment of a coolant path in the housing 100.

In the present case, the DC-DC converter 111 is directly thermally coupled to the electronics housing 101, whereas the DC breaker 113 is indirectly coupled to the electronics housing 101 via a separating element 121, and is correspondingly thermally coupled to the coolant path thereof.

The DC-DC converter 111 and the battery cell management system 115 assume a transmitter and receiver function and, in the present case, are arranged together in the electronics housing 101.

FIG. 2 represents a structural space 123 of the electronics housing 101 for the DC-DC converter 111, and a structural space 125 of the electronics housing 101 for the DC breaker 113 and the battery cell management system 115. In the absence of electromagnetic shielding, on the grounds of the restricted structural spaces 123 and 125, undesirable interactions can occur between electronic components.

In order to prevent undesirable interactions between electronic components, the different structural spaces 123 and 125 are configured in an electromagnetically shielded arrangement from one another. To this end, the separating element 121 is electrically coupled to the electronics housing 101, such that electromagnetic waves which penetrate the separating element 121 are diverted into the electronics housing 101.

Figure 3:
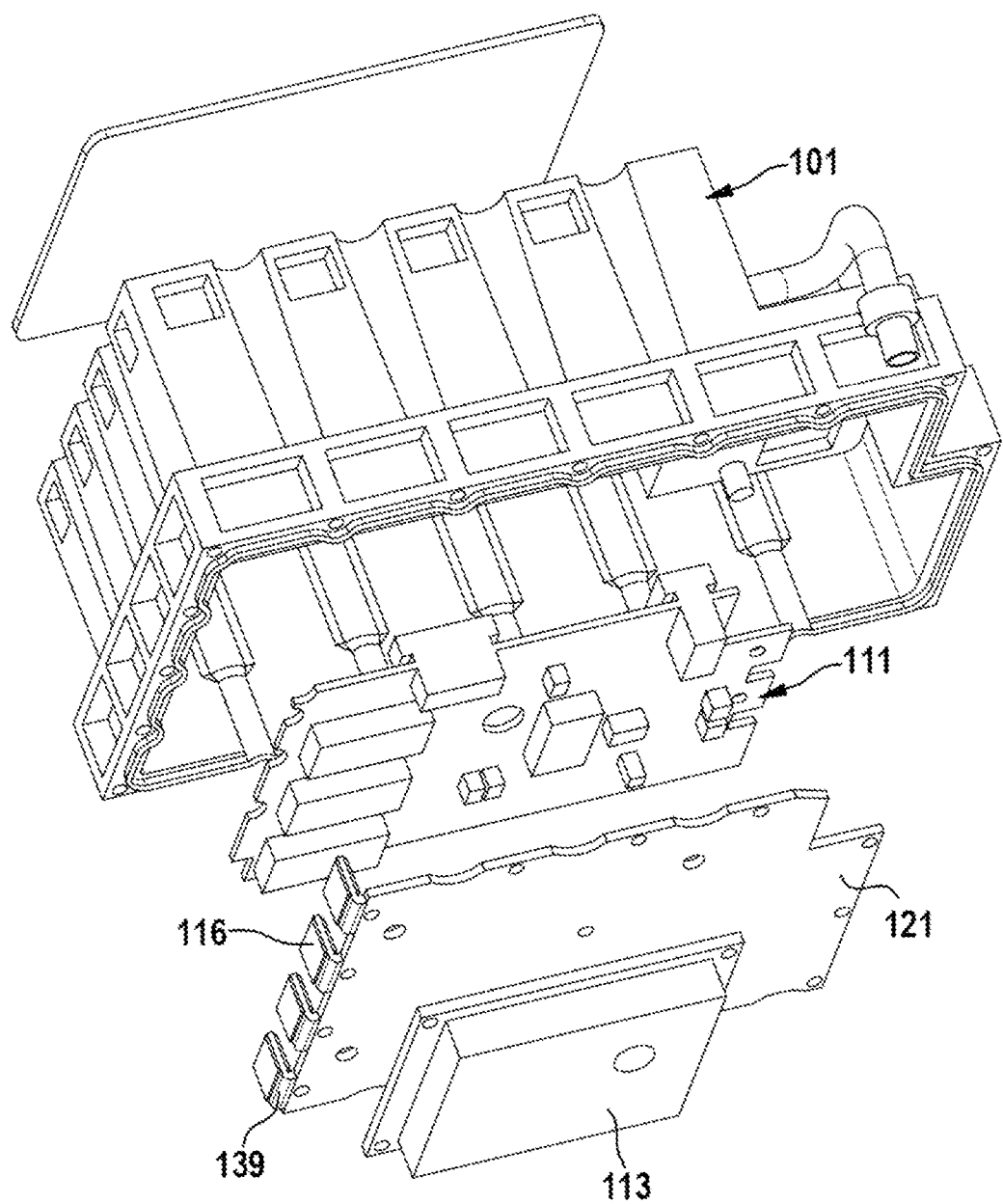
FIG. 3 shows a representation of components of an electronics housing of the housing according to FIG. 1.

FIG. 3 represents the electronics housing 101, with a DC-DC converter 111, a DC breaker 113 and a separating element 121. In the present case, the DC-DC converter 111 is arranged on the inner side of the electronics housing 101, and is directly coupled to a thermal contact surface of the electronics housing 101. The DC breaker 113 is arranged in the Z-axis below the DC-DC converter 111, and is indirectly thermally coupled to the electronics housing 101 by means of the separating element 121, and is thus coupled to the coolant path thereof or to a coolant flowing therein. In this case, the separating element comprises optional thermal connectors 116, which are arranged on thermal couplers 139 of the separating element 121, and which maximize the transfer of thermal energy from the separating element 121 to the electronics housing 101. The battery cell management system 115, which is not represented here, is arranged in the Z-axis below the DC breaker 113.

Figure 4:
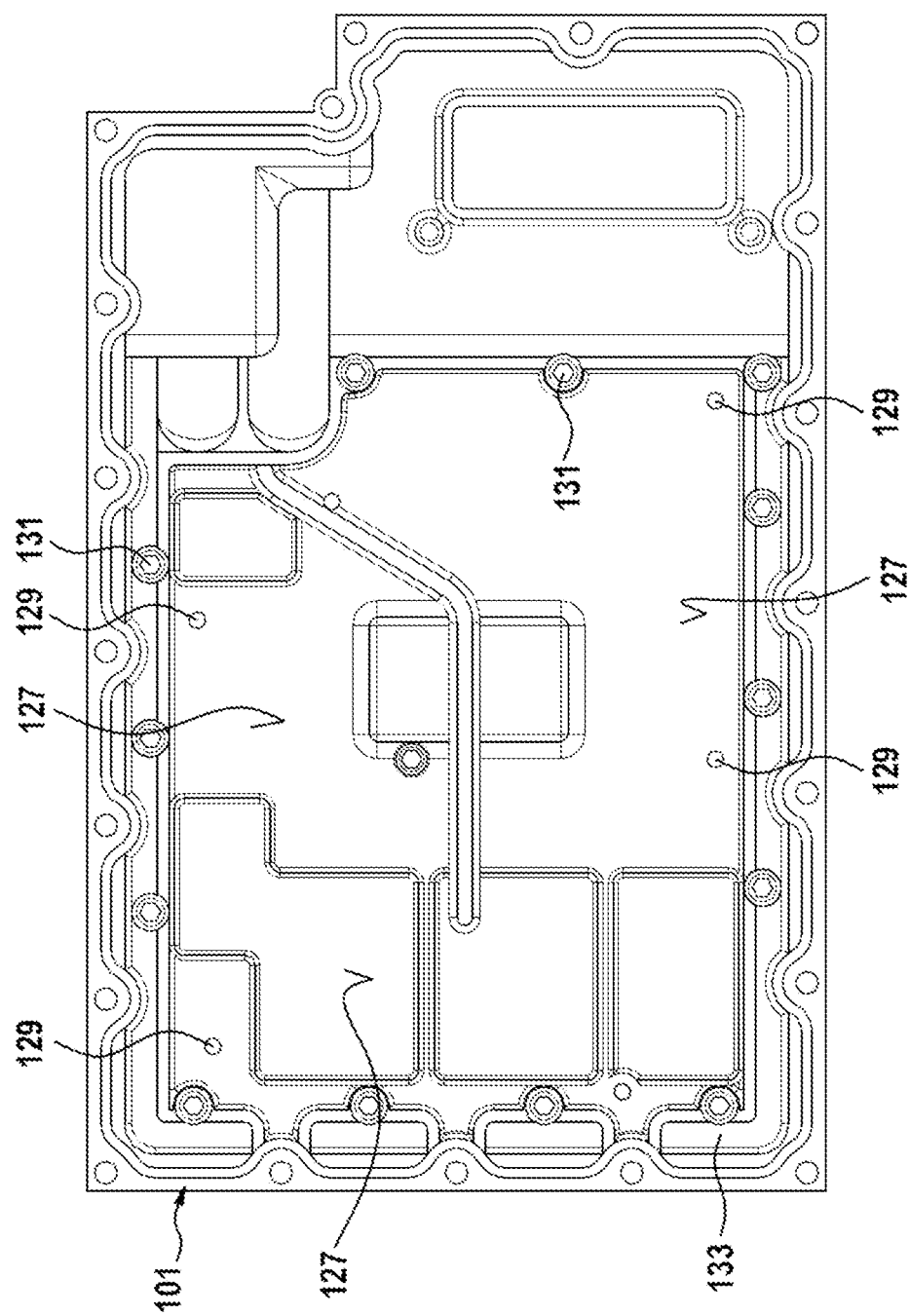
FIG. 4 shows a detailed representation of a basic component of the electronics housing according to FIG. 3.

FIG. 4 represents an inner housing side of the electronics housing 101, with mechanical interfaces 129 for the mechanical coupling of the DC-DC converter 111, circumferential mechanical interfaces 131 for the mechanical coupling of the separating element 121, and thermal interfaces 133 for the thermal coupling of the separating element 121 with the electronics housing 101. In the present case, the mechanical interfaces 131 for the mechanical coupling of the separating element 121 with the electronics housing 101 are exemplarily represented in the form of molded ribs with centrally-arranged screw connection points, in which locators for the location of screws are incorporated.

On the thermal contact surfaces 127 for the thermal coupling of the DC-DC converter 111 with the electronics housing 101, thermal connecting elements such as, for example, "gap fillers", thermally conductive adhesives or "gap pads" can be applied. The DC-DC converter 111 can, for example, be mechanically coupled to the electronics housing 101 by the screw connection of its circuit board at mechanical interfaces 129, such that a very short thermal conduction path is constituted between the coolant circulating in the electronics housing 101 and the DC-DC converter 111, with minimized thermal resistance.

Figure 5:
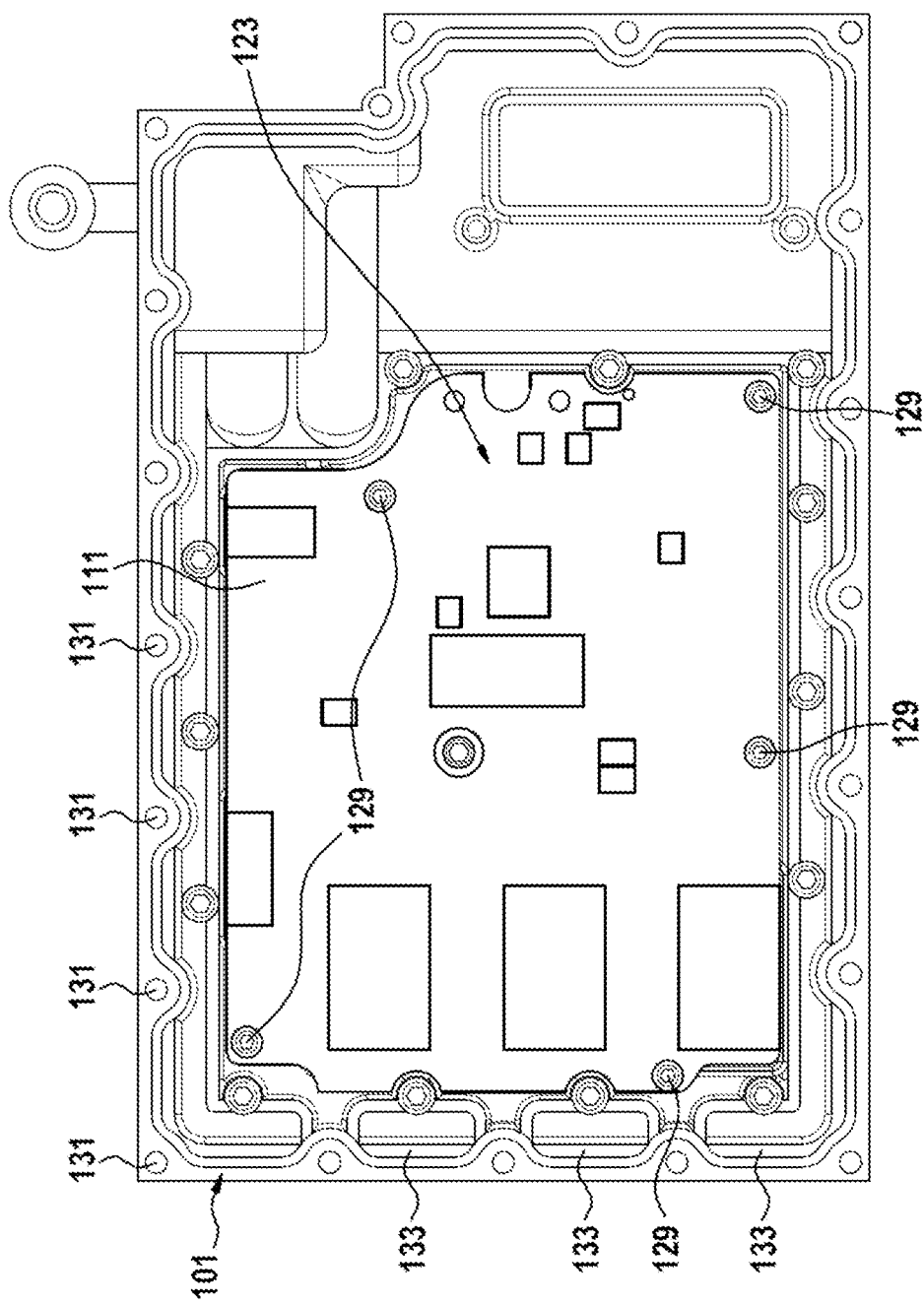
FIG. 5 shows the electronics housing according to FIG. 3, having an electronic component.

FIG. 5 represents the integration of the DC-DC converter 111 in the electronics housing 101. For the embodiment represented, a gap filler is preferentially employed for thermal coupling.

Figure 6:
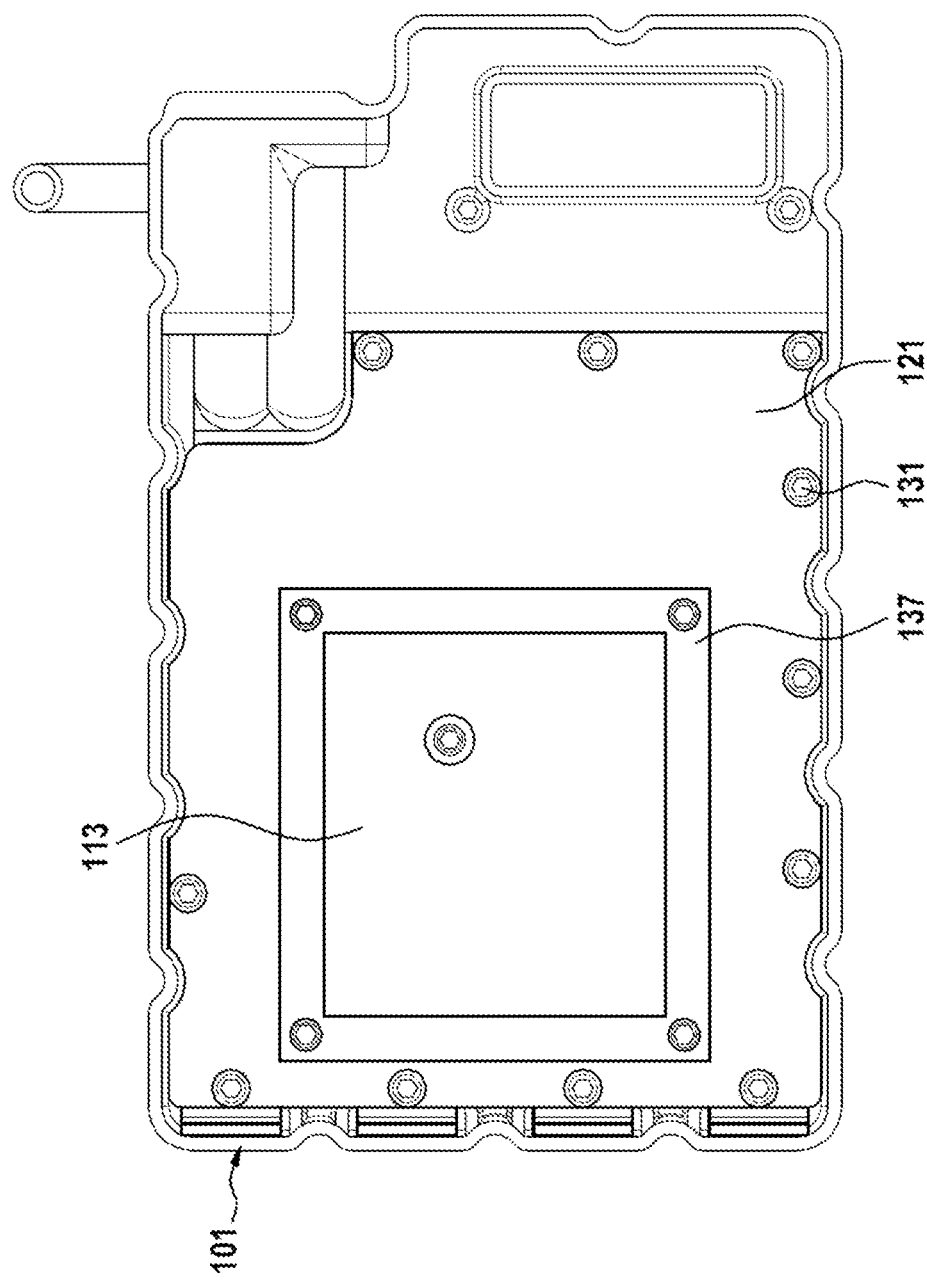
FIG. 6 shows the electronics housing according to FIG. 3, having a separating element and a further electronic component.

FIG. 6 represents a housing underside of the electronics housing 101, with an integrated DC breaker 113. In this case, the separating element 121 is exemplarily embodied in the form of a bent aluminum part.

In this case, the electronics housing 101 is exemplarily embodied in the form of a pressure die-cast aluminum component.

The constitution of the electronics housing 101 and the separating element 121 of aluminum materials provides an advantage, firstly in that, in the event of thermal loading, as a result of their equal coefficient of thermal expansion, these two elements undergo no mutual strain, and secondly in that very good thermal conductivity is provided. This is of particular importance for the thermal coupling of the DC breaker 113, as the latter is thermally coupled to the electronics housing 101 via a long thermal conduction path, or indirectly via the separating element 121.

Naturally, other materials are also conceivable for the separating element 121 such as, for example, a copper alloy which, in comparison with aluminum, provides even higher thermal conductivity.

The separating element 121 simultaneously functions as a "heat spreader", i.e. for the distribution of a thermal load which is generated by electronic components in the electronics housing 101.

The separating element 121 additionally functions as a short-term thermal buffer. This is firstly dependent upon the mass of the separating element 121, and secondly upon the thermal capacity of the separating element 121.

In the event of short current pulses, which generate thermal loading of the DC breaker 113 during switching operations, thermal buffering by the separating element 121 results in a reduced heat-up of electronic components, and thus has a direct influence upon the service life of electronic components. In order to optimize this effect, the DC breaker 113 can be thermally coupled with the separating element via the largest possible surface area of thermal interfaces. Depending upon thermal requirements for the DC breaker 113, the number and size of thermal couplers on the separating element 121 can be varied. Thermal couplers, which can be configured, for example, in the form of tongues, can be optionally provided on all four sides of the separating element 121.

The separating element 121 is mechanically coupled to the electronics housing 101 by means of circumferential mechanical interfaces 137 such as, for example, screw connections. This provides an advantage, in that the electronics housing 101 is particularly rigid and, in the event of an accident or an external mechanical influence, constitutes a load plane with an exceptionally high load capacity.

Moreover, by means of the mechanical interfaces 121, a mechanically reliable connection is constituted between the electronics housing and the separating element 121.

The separating element 121 can optionally comprise stiffening beads, in order to further enhance the rigidity of the electronics housing 101, and to further increase the mechanical loading capacity thereof.

Additionally, the thickness of the separating element 121 can be increased. This firstly improves the thermal conductivity thereof, and second improves the rigidity thereof.

Thermal coupling of the separating element 121 to the electronics housing 101, and thus to the coolant flowing in the electronics housing or to a corresponding heat sink, is executed, for example, by means of mechanical couplers on the separating element 121 which are bent through 90°. These engage with corresponding mating couplers in the electronics housing 101.

Thermal contact-connection of the thermal couplers on the separating element 121 and the mating couplers on the electronics housing 101 is executed, for example, by means of a thermally conductive adhesive or a thermally conductive casting compound. Alternatively or additionally, "gap fillers" or "gap pads" are conceivable, as the mechanical coupling of the separating element 121 with the electronics housing 101 is achieved by means of the mechanical interfaces 137. Correspondingly, for the thermal coupling of the separating element 121 and the electronics housing 101, thermally conductive materials having a high thermal conductivity can be employed, as these can be constituted or selected independently of the mechanical coupling of the separating element 121 with the electronics housing 101.

Thermal coupling of the DC breaker 113 with the separating element 121 is executed, for example, by means of thermal interfaces 133, in which, for example, "gap fillers" or a "gap pad" can be introduced. Additionally or alternatively, thermal coupling of the DC breaker 113 with the separating element 121 by means of a thermally conductive adhesive is conceivable.

Mechanical coupling of the DC breaker 113 to the separating element 121 is executed by means of mechanical interfaces 137 such as, for example, screw connections, such that the thermal interfaces 133 are only required to assume thermal coupling. Correspondingly, for the thermal interfaces, thermally conductive materials having a high thermal conductivity can be employed, as mechanical connection is achieved by means of the mechanical interfaces.

Figure 7:
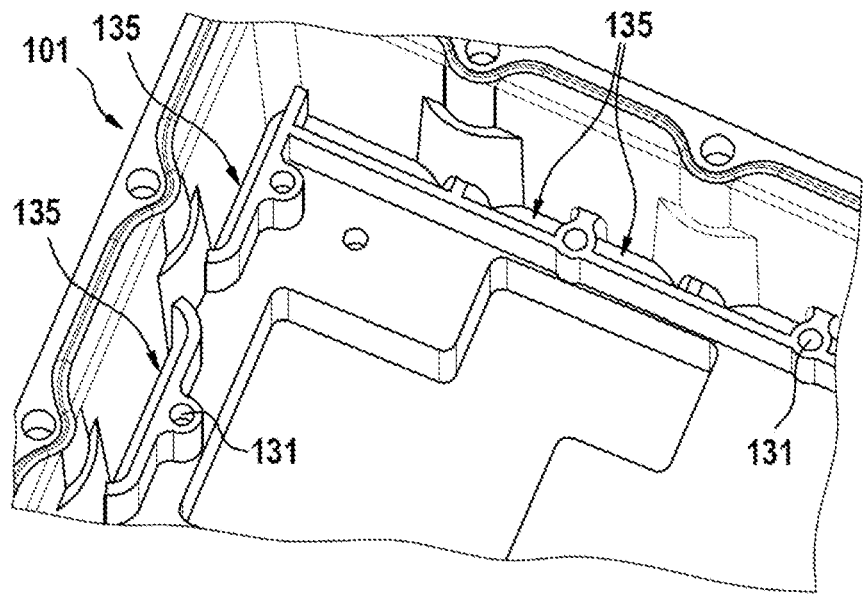
FIG. 7 shows a detailed representation of mechanical and thermal interfaces of the electronics housing according to FIG. 3.

FIG. 7 shows a detailed representation of the thermal mating couplers 137 of thermal interfaces 133 for the thermal coupling of the electronics housing 101 with the separating element 121.

In the present case, the thermal mating couplers 137 are configured in the form of pockets, and are produced in a pressure die-casting process for the manufacture of the electronics housing 101. In a directly central position on each pocket, in each case, a mechanical interface 131 is provided such as, for example a screw-fixing dome for the screw attachment of the separating element 121 to the electronics housing 101.

In an arrangement of the separating element 121 on the electronics housing 101, in the pockets of the electronics housing 101, for example, a thermally conductive casting compound is introduced. Alternatively or additionally, a thermally conductive adhesive or a "gap filler" can be introduced. In the arrangement of the separating element 121 on the electronics housing 101, the couplers cooperate with the thermal mating couplers 137 such that, for example, the tongues of the separating element 121 engage in the pockets of the electronics housing 101, and compress the casting compound which is contained therein. The separating element 121, by the tightening of a screw connection in direct proximity to the pockets, is compressed into the casting compound, and is additionally secured during the curing time thereof. Accordingly, no additional fixing elements are required for the curing process. Moreover, the separating element 121, in the region of the pockets, is mechanically secured over the full service lifetime, such that any failure of thermal coupling is prevented.

Depending upon thermal requirements for heat evacuation from the DC breaker 113, tongues and pockets can be configured circumferentially about the perimeter of the separating element or the electronics housing 101.

Figure 8:
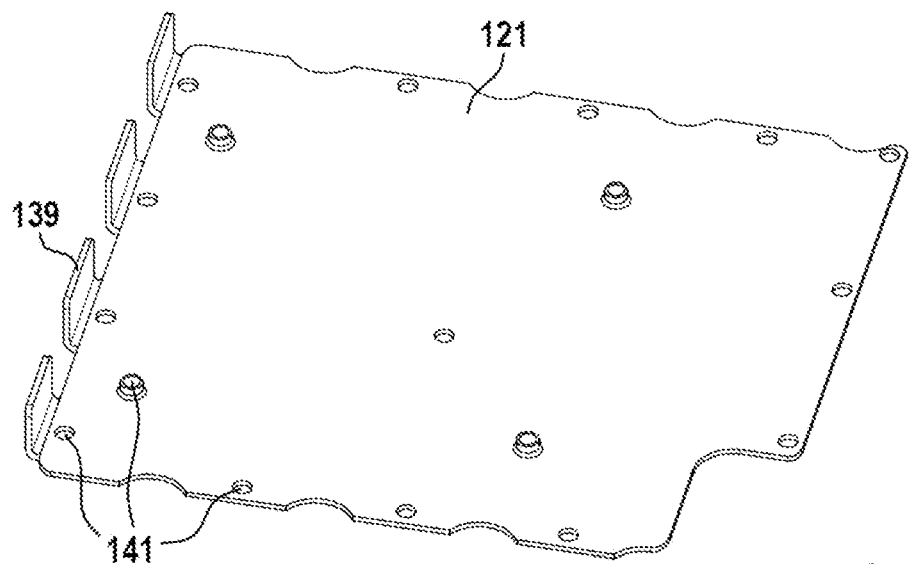
FIG. 8 shows a detailed representation of the separating element according to FIG. 6.

FIG. 8 represents the separating element 121 with thermal couplers 139 in the form of tongues, and mechanical couplers 141 in the form of screw connection points.

Figure 9:
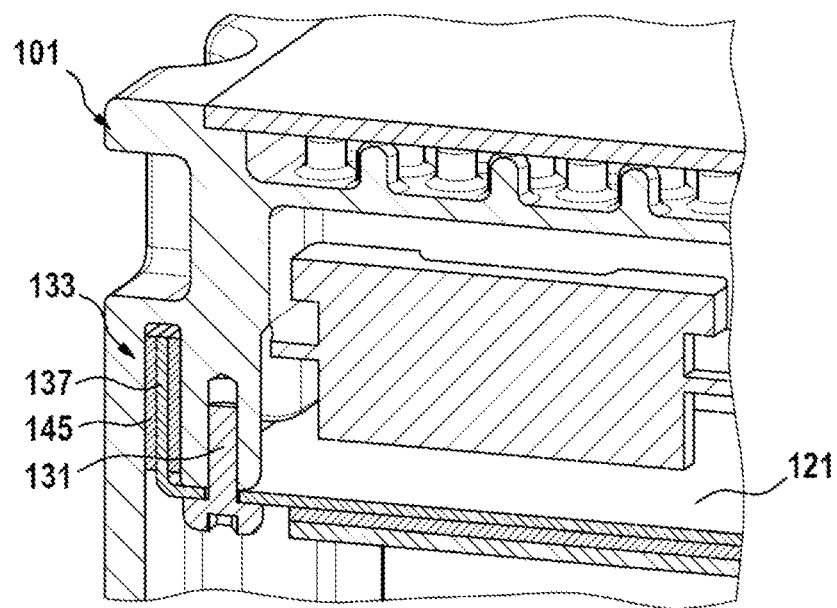
FIG. 9 shows a lateral sectional representation of the electronics housing according to FIG. 3.

FIG. 9 represents a thermal interface 133 having a mating coupler 137 in the form of a pocket on the electronics housing 101, and a thermal coupler 137 which engages therein, in the form of a tongue having a thermally conductive element 145 of the separating element 121, and a mechanical interface 137 in the form of a screw connection.

The separating element 121 is mechanically coupled to the electronics housing 101 by means of the mechanical interface 131.

Figure 10:
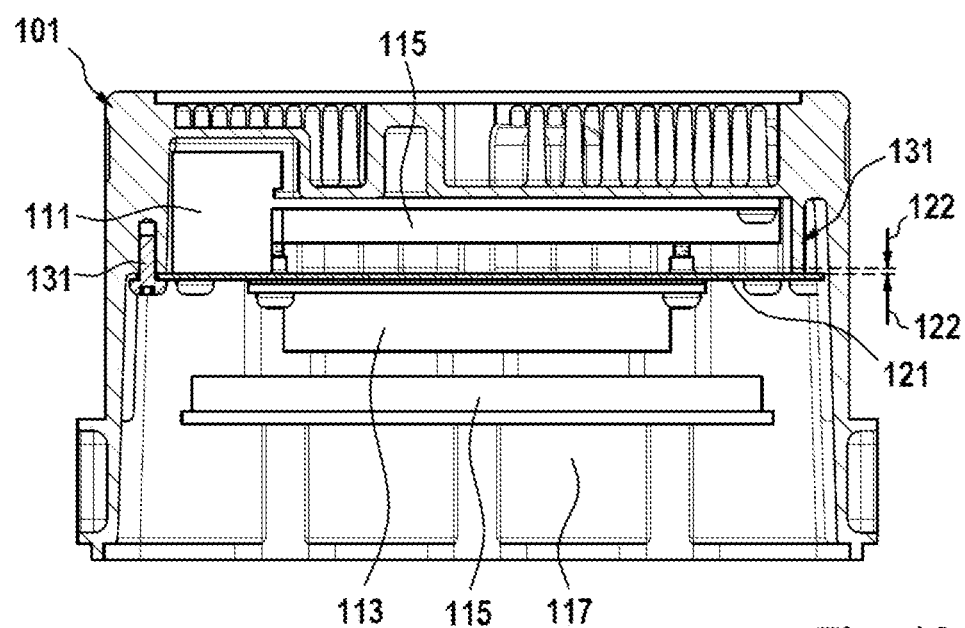
FIG. 10 shows a lateral sectional representation of the housing according to FIG. 1.
Figure 11:
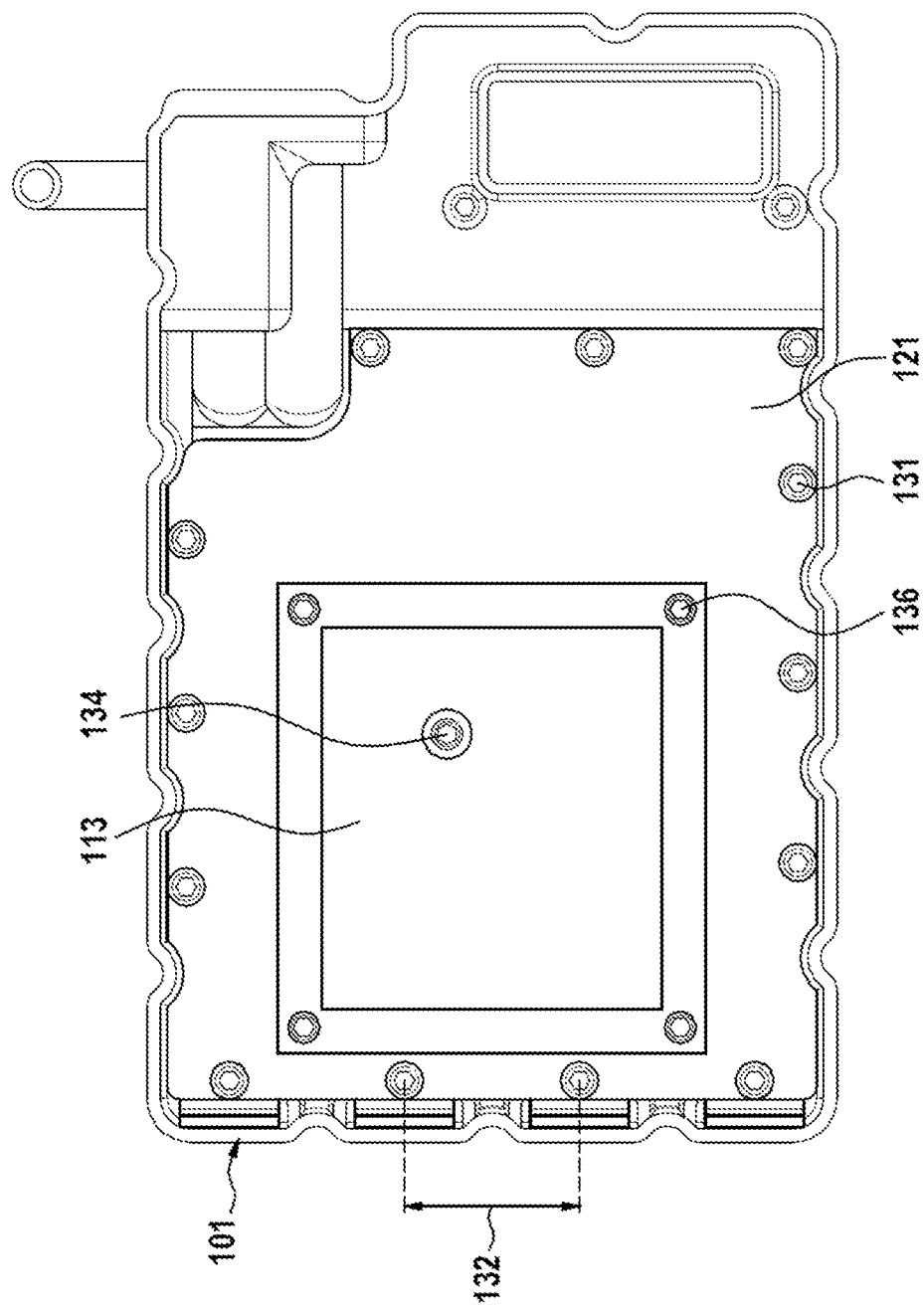
FIG. 11 shows a further view of the electronics housing according to FIG. 3.

FIG. 10 represents the separating element 121 for the electromagnetic shielding of the structural space 123 for the DC-DC converter 111 from the structural space 125 for the DC breaker 113, with the battery cell management system 115.

In order to achieve the electromagnetic shielding of the two structural spaces 123, 125 from one another, the separating element 125 is electrically coupled to the electronics housing 101 by means of a metallic connection. Electromagnetic shielding is dependent upon the gap between the electronics housing 101 and the separating element 121, and upon the clearances, as indicated by the arrow 132, between the respective mechanical interfaces 131 for the mechanical coupling of the separating element 121 and the electronics housing 101.

In order to close or minimize the gap between the separating element 121 and the electronics housing 101, the electronics housing 101 is provided with circumferential mechanical interfaces 131 in the form of a molded rib which engages with the separating element 121.

In order to ensure an optimum engagement of the separating element 121 with the molded rib, the separating element 121 is screwed to the electronics housing 101 at specific intervals. A secure electrical connection is thus provided at the mechanical interfaces 131. By means of the circumferential screw connection and the engagement of the separating element 121 with molded ribs on the electronics housing 101, the structural space 123 of the DC-DC converter 111 is electromagnetically shielded from the structural space 125 of the DC breaker 113, and from the battery cell management system 115. Screw spacings are selected for the optimum circumferential engagement of the separating element 121 with the ribs. Screw spacings are moreover selected such that, depending upon EMC requirements, a secure electrical contact is provided. Depending upon the size of the permissible gap between the separating element 121 and the molded ribs, both the molded ribs and the screw eyes on the electronics housing 101 can be mechanically reworked. It is thus possible to work to very fine tolerances, thereby resulting in the minimization of the gap, and thus in optimum EMC shielding.

The DC breaker 113 is mechanically coupled to the separating element 121 by means of screw connections 136 in its circuit board.

The circuit board of the DC breaker 113 incorporates a cut-out 134, into which a screw connection for the mechanical coupling of the separating element 121 with the electronics housing 101 is introduced.

The DC breaker 113 must be electrically connected to the DC-DC converter 111. To this end, the separating element 121, below the DC breaker 113, is optionally provided with an electromagnetically shielded electrical interface 147 such as, for example, a direct contact-connection arrangement of the two circuit boards of the DC-DC converter 111 and the DC breaker 113, which is provided with EMC shielding, or an EMC-appropriate plug-in connection.

Figure 12:
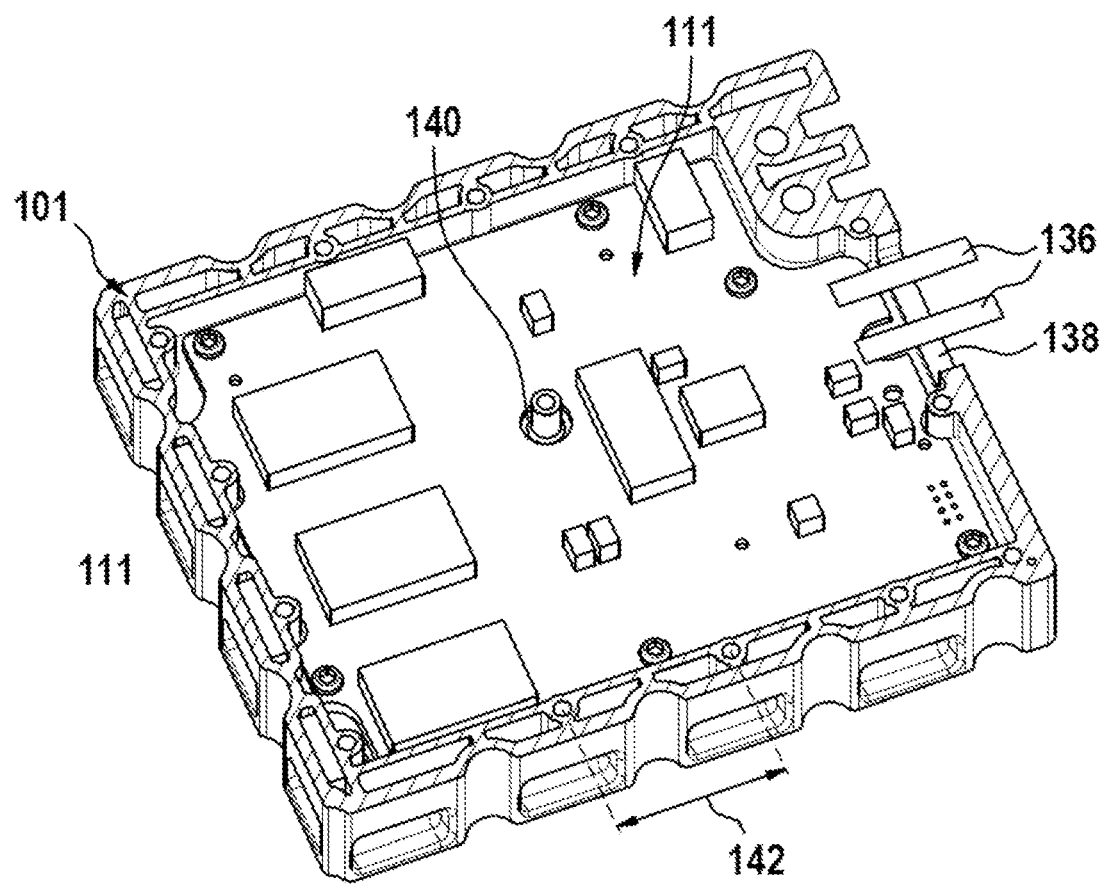
FIG. 12 shows a detailed representation of an electrical interface of the electronics housing according to FIG. 3.

FIG. 12 represents an electrical interface 136 for the communication of the DC-DC converter 111 with an external system such as, for example, a vehicle interface. This interface is led out through a recess 138 in the electronics housing 101 within the shielded structural space 123 for the DC-DC converter 111. The circuit board of the DC-DC converter 111 also incorporates a cut-out 140, into which a screw connection for the mechanical coupling of the separating element 121 with the electronics housing 101 is introduced.

An arrow 142 indicates a spacing between respective screw connection points on the mechanical interfaces 133 of the electronics housing.

Figure 13:
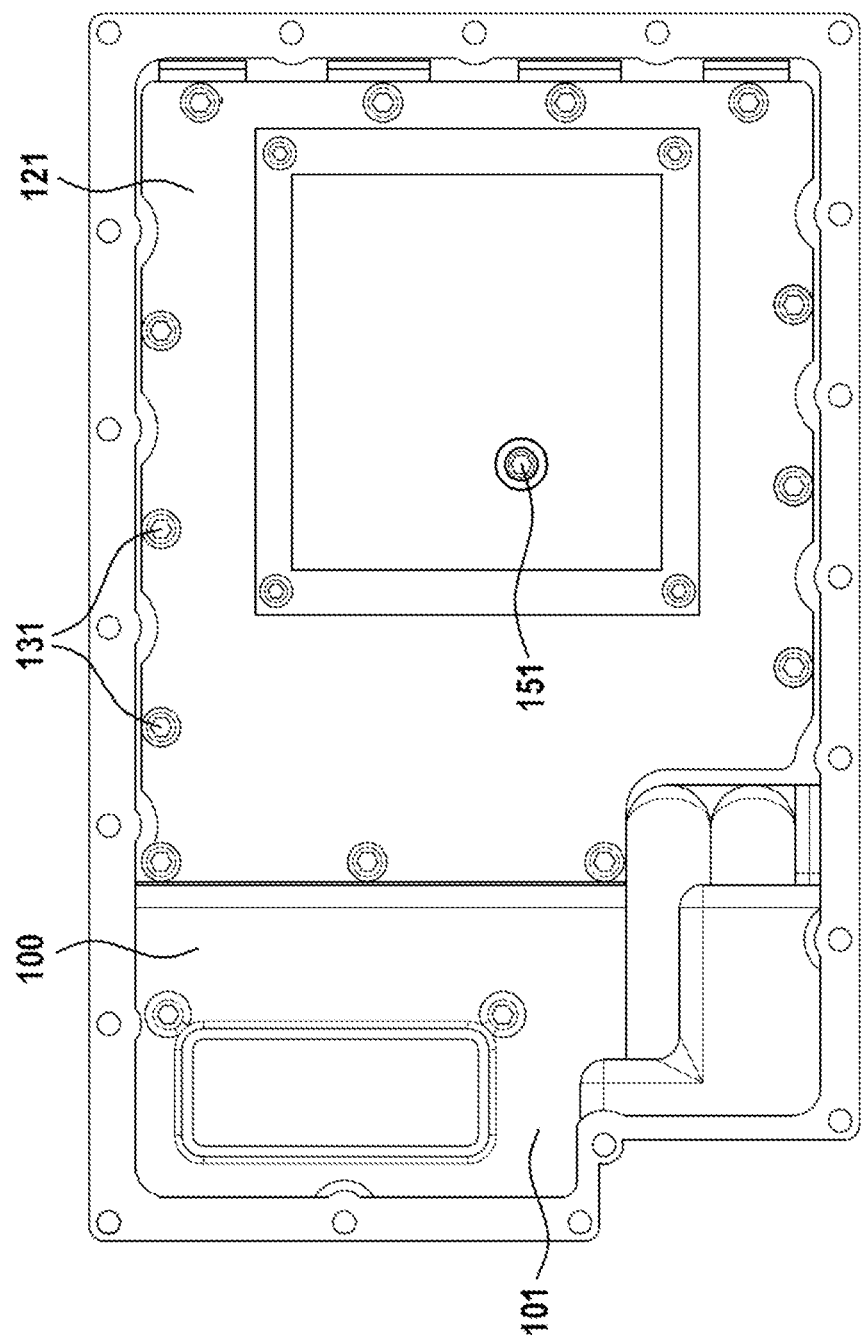
FIG. 13 shows a representation of a force path through the electronics housing according to FIG. 3, in the event of mechanical loading.

By means of corresponding arrows, FIG. 13 represents load inputs in the X- and Y-axis in the event of mechanical loading associated with an accident. In the event of an accident, the load is damped, firstly by the sandwich construction of the cooling duct in a base structure of the housing 100, and secondly by the sandwich construction of the cooling duct in the electronics housing 101.

The separating element 121 constitutes a third plane, which can transfer the load in the X- and Y-axes in the event of an accident. A load transfer is only possible if the separating element 121 is structurally connected to the electronics housing 101. This is ensured by the circumferential mechanical interfaces 131. In order to prevent any buckling of the separating element 121 in response to loading, a central mechanical interface 151 is provided at the center thereof. Both the thickness and the material of the separating element 121 can be selected in accordance with the requisite notional load. In this case, a high-strength wrought aluminum alloy is preferentially employed. Moreover, according to requirements for the further enhancement of rigidity, stiffening beads can be incorporated in a longitudinal or transverse direction, or diagonally in the separating element 121.

It is moreover conceivable for an entire region of the separating element 121 to be bent round into the Z-axis, in which the DC breaker 113 is then incorporated. This also results in a stiffening of the separating element 121, and prevents any buckling in the event of an accident.

Figure 14:
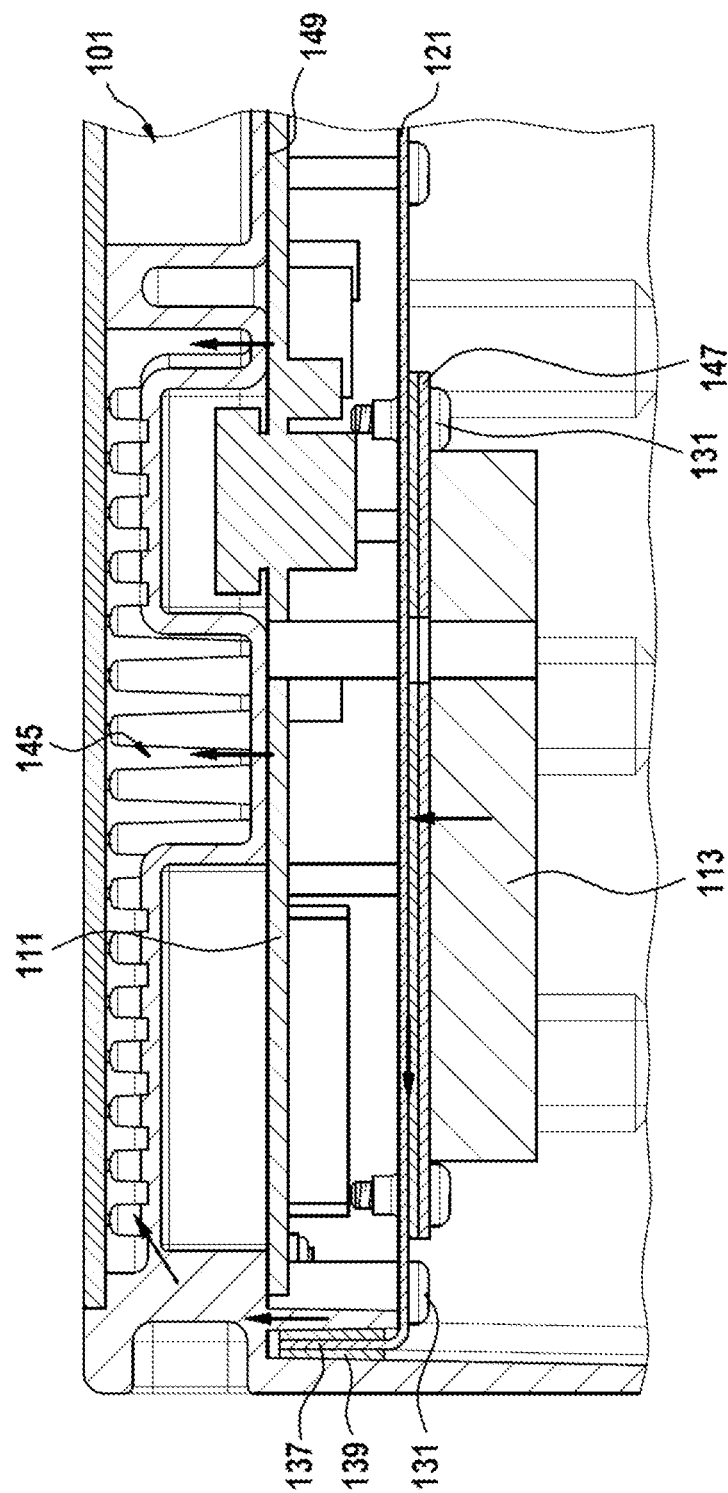
FIG. 14 shows a representation of a thermal conduction path through the electronics housing according to FIG. 3.

FIG. 14 represents the thermal path for the evacuation of heat from the DC-DC converter 111, and from the DC breaker 113. The thermal path from the circuit board of the DC-DC converter 111 to the coolant or to a heat sink is very short. Heat is transferred from the circuit board of the DC converter 111, via a thermal coupler, through the housing wall into the cooling duct, and thus to the coolant.

The thermal path of the DC breaker 113 is structured as follows: heat is transferred from the circuit board of the DC breaker 113 via a thermal coupler to the separating element 121. Thereafter, heat is transferred via the thermal coupler 139 of the separating element 121 to the mating coupler 137 of the electronics housing 101, and through the housing wall into the cooling duct 145, and thus to the coolant.

In the present case, the DC breaker comprises a thermally conductive element 147 for thermal coupling with the separating element 121. Analogously, in the present case, the DC-DC converter 111 comprises a thermally conductive element 149 for thermal coupling with the electronics housing 101.

Figure 15:
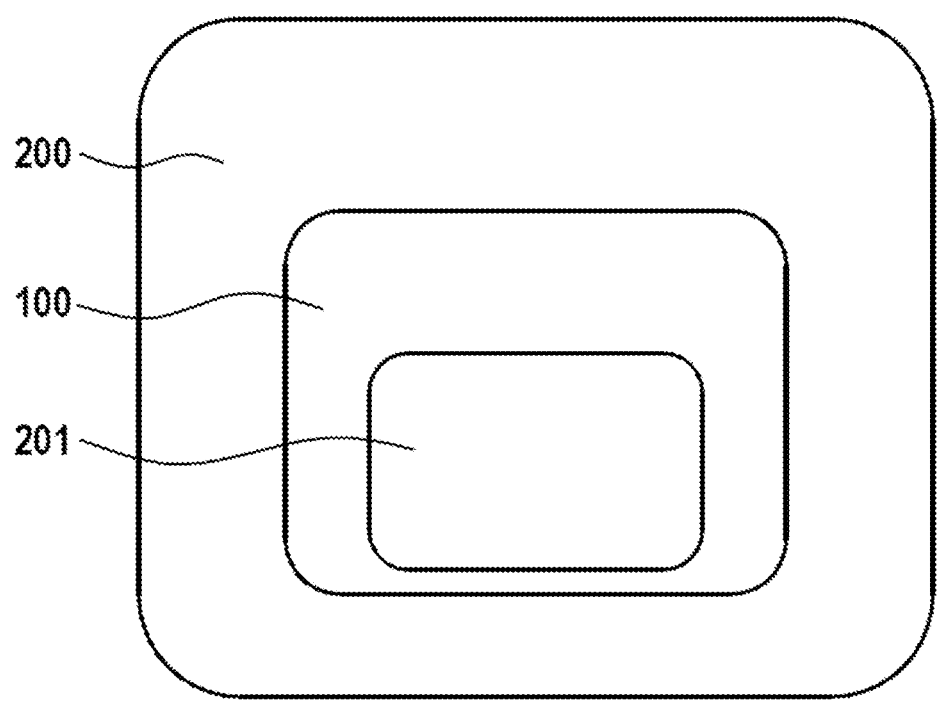
FIG. 15 shows a potential configuration of the proposed battery system.

FIG. 15 represents a battery system 200, having a battery 201 and a housing 100.

What is claimed is:

1. A housing (100) for accommodating battery cells and a plurality of electronic components (111, 113, 115)
    wherein the housing (100) comprises:
        an electronics housing (101) for accommodating the plurality of electronic components (111, 113, 115);
        a cell housing (103) for accommodating the battery cells; and
        at least one coolant path (145) for temperature control of the housing (100), wherein a one-piece separating element (121) is arranged in the electronics housing (101) and divides the electronics housing (101) into at least two regions (115, 117) for the respective accommodation of electronic components (111, 113, 115) of the plurality of electronic components (111, 113, 115), wherein the separating element (121) electromagnetically shields respective regions (115, 117) of the at least two regions (115, 117) from one another, and
        wherein the separating element (121) is thermally coupled to the at least one coolant path (145), in order to transfer thermal energy from the respective electronic components (111, 113, 115) to coolant flowing in the at least one coolant path (145), and wherein the separating element (121) includes thermal couplers (139) configured to engage with the electronics housing 101 to transfer thermal energy from the separating element (121) to the electronics housing (101).

2. The housing (100) according to claim 1, wherein the separating element (121) is mechanically coupled to the electronics housing (101) via at least one mechanical interface (131), and wherein the separating element (121) is thermally coupled to the electronics housing (101) via at least one thermal interface (133), which differs from the mechanical interface (131).

3. The housing (100) according to claim 2, wherein the separating element (121) is arranged with a metallic connection to the at least one mechanical interface (131), in order to electrically couple the separating element (121) to the electronics housing (101).

4. The housing (100) according to claim 2, wherein the at least one mechanical interface (131) comprises a circumferential ribbed arrangement which is constituted on the electronics housing (101), wherein respective ribs of the ribbed arrangement are configured in the form of screw connection points.

5. The housing (100) according to claim 4, wherein the at least one thermal interface (133) comprises mating couplers (137) for thermal coupling with couplers on the separating element, wherein the mating couplers (137) are constituted between respective ribs of the ribbed arrangement and/or circumferentially about the respective ribs.

6. The housing (100) according to claim 1, wherein a plurality of electronic components (111, 113, 115) is arranged in the housing (100), and wherein the separating element (121) is directly thermally coupled with at least one of the electronic components (111, 113, 115) arranged in the electronics housing, in order to thermally couple the at least one electronic component (111, 113, 115) which is thermally coupled with the separating element (121) to the coolant flowing in the at least one coolant path (145), and wherein the electronics housing (101) is directly thermally coupled with at least one further electronic component (111, 113, 115) arranged in the electronics housing (101), in order to couple the at least one electronic component (111, 113, 115) which is thermally coupled with the electronics housing to the coolant flowing in the at least one coolant path (145).

7. The housing (100) according to claim 1, wherein the separating element (121) incorporates a cut-out (138), having an electromagnetically shielded electrical interface (136) for electrical connection between respective electrical components which are mutually separated by the separating element (121).

8. The housing (100) according to claim 1, wherein the electronics housing (101) comprises an electrical interface for communication with a system which is located externally to the housing (100).

9. The housing (100) according to claim 1, wherein the separating element (121) incorporates multiple curves, in order to constitute a space for the location of an electronic component (111, 113, 115) with maximum rigidity.

10. The housing (100) according to claim 3, wherein the at least one mechanical interface (131) comprises a circumferential ribbed arrangement which is constituted on the electronics housing (101), wherein respective ribs of the ribbed arrangement are configured in the form of screw connection points.

11. The housing (100) according to claim 10, wherein the at least one thermal interface (133) comprises mating couplers (137) for thermal coupling with couplers on the separating element, wherein the mating couplers (137) are constituted between respective ribs of the ribbed arrangement and/or circumferentially about the respective ribs.

12. The housing (100) according to claim 11, wherein a plurality of electronic components (111, 113, 115) is arranged in the housing (100), and wherein the separating element (121) is directly thermally coupled with at least one of the electronic components (111, 113, 115) arranged in the electronics housing, in order to thermally couple the at least one electronic component (111, 113, 115) which is thermally coupled with the separating element (121) to the coolant flowing in the at least one coolant path (145), and wherein the electronics housing (101) is directly thermally coupled with at least one further electronic component (111, 113, 115) arranged in the electronics housing (101), in order to couple the at least one electronic component (111, 113, 115) which is thermally coupled with the electronics housing to the coolant flowing in the at least one coolant path (145).

13. The housing (100) according to claim 12, wherein the separating element (121) incorporates a cut-out (138), having an electromagnetically shielded electrical interface (136) for electrical connection between respective electrical components which are mutually separated by the separating element (121).

14. The housing (100) according to claim 13, wherein the electronics housing (101) comprises an electrical interface for communication with a system which is located externally to the housing (100).

15. The housing (100) according to claim 14, wherein the separating element (121) incorporates multiple curves, in order to constitute a space for the location of an electronic component (111, 113, 115) with maximum rigidity.

16. A battery system (200) having a battery (201) and the housing (100) according to claim 1.

17. The battery system (200) according to claim 16, wherein the separating element (121) is mechanically coupled to the electronics housing (101) via at least one mechanical interface (131), and wherein the separating element (121) is thermally coupled to the electronics housing (101) via at least one thermal interface (133), which differs from the mechanical interface (131).

18. The battery system (200) according to claim 17, wherein the separating element (121) is arranged with a metallic connection to the at least one mechanical interface (131), in order to electrically couple the separating element (121) to the electronics housing (101).

19. The battery system (200) according to claim 17, wherein the at least one mechanical interface (131) comprises a circumferential ribbed arrangement which is constituted on the electronics housing (101), wherein respective ribs of the ribbed arrangement are configured in the form of screw connection points.

20. The battery system (200) according to claim 19, wherein the at least one thermal interface (133) comprises mating couplers (137) for thermal coupling with couplers on the separating element, wherein the mating couplers (137) are constituted between respective ribs of the ribbed arrangement and/or circumferentially about the respective ribs.

* * * * *